United States Patent Office 3,247,900
Patented Apr. 26, 1966

3,247,900
METHOD AND COMPOSITION FOR WELL
TREATMENT
Robert O. Perry and John L. Boyd, Tulsa, Okla., assignors, by mesne assignments, to Sinclair Research, Inc., New York, N.Y., a corporation of Delaware
No Drawing. Filed Jan. 6, 1960, Ser. No. 689
23 Claims. (Cl. 166—33)

This invention relates to novel resin-forming compositions and to a method for polymerizing liquid resin-forming materials suitable for use in relatively inaccessible areas, e.g. in well bores penetrating permeable subterranean formations. More particularly the present invention is concerned with a method for controlling the copolymerization of a catalyzed mixture of an alkylidene bisacrylamide monomer and an ethylenic monomer by incorporating fluoride ions into the mixture and contacting the mixture with silica to effect, when desired, the copolymerization of the monomers.

These resin-forming materials have particular utility in the well treating field, e.g. processes which combat the obstruction of gas circulation when gas-drilling wells through permeable subsurface formations and processes which partially or completely plug permeable subterranean well areas. Presently chemical polymerization catalysts, e.g. a redox catalyst system, i.e an oxidation-reduction catalytic polymerization system, e.g. ammonium persulfate-nitrilotrispropionamide system, are added to the liquid resin-forming material near the well site prior to placing the material at the desired location within the well bore. This procedure renders control difficult during the crucial moments of polymerization since sometimes the polymerization of the resin-forming material, causing a change from a mobile liquid to a more or less solid mass, is entirely too rapid to enable an operator to place the liquid in the desired location in the well bore. On the other hand, polymerization of the material is sometimes too slow such that any existing turbulence in the well bore will move the material out of position and thus critically curtail its sealing effect. Use under these conditions also completely disrupts the reproducibility of gel times. Furthermore, it has been very difficult, if not impossible, to make any change in the gel time by chemical means after the solution has been injected into the formation. This means that for the most part once the solution is prepared, the gel time is fixed and cannot be shortened nor lengthened in the event of unforseen difficulties. Another disadvantage in this procedure lay in the difficulties encountered due to the treatment required of the resin-forming material at the well site, which is seldom convenient, prior to its introduction into the well bore.

The present invention is directed to a method providing good control of the copolymerization time or set time of a catalyzed mixture of alkylidene bisacrylamide and ethylenic monomers, particularly when this material is copolymerized in a well bore hole penetrating a permeable subterranean formation. The desired result is accomplished by incorporating polymerization inhibiting amounts of fluoride ions into an aqueous mixture of the alkylidene bisacrylamide and the ethylenic monomer containing catalytic amounts of a redox catalyst system and contacting this mixture with polymerization initiation amounts of silica to effect polymerization.

The novel liquid resin-forming materials which are employed in the method of the present invention and are particularly suitable for use in the well bore treating field include an aqueous solution of an alkylidene bisacrylamide and an ethylenic comonomer, the former having the formula:

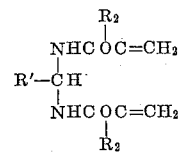

in which

is a hydrocarbon residue of an aldehyde containing, for instance, from about 1 to 10 and preferably from about 1 to 5 carbon atoms, e.g. formalde-, acetalde-, and valeraldehyde; but usually about 1 to 3 carbon atoms and $R_2$ is a member of the group consisting of hydrogen and a methyl radical.

The other comonomer is a solid, liquid or gaseous ethylenic (i.e., contains at least $>C=C<$ radical) compound with a solubility of at least about 2% by weight, and preferably at least about 5%, in water and which copolymerizes with the aforesaid bisacrylamide in an aqueous system. Although not essential in practicing the invention, it is preferred to select an ethylenic comonomer which is preferably soluble or at least self-dispersible in water with appropriate stirring, as such, for example, methylene bisacrylamide, which is capable of polymerizing.

In addition to the comonomer N,N'-methylene bisacrylamide set out in the examples hereinafter, any of the alkylidene bisacrylamides corresponding to the above formula which are described and claimed in Lundberg Patent No. 2,474,486, hereby incorporated by reference, or mixtures thereof may be used as cross-linking agents. Only slight solubility is required of the alkylidene bisacrylamide in view of the small amount used; therefore, this component may have a water solubility as low as about 0.02% by weight at 20° C. but a solubility of at least about 0.10% is more desirable for general purposes.

A wide variety of ethylenic comonomers or mixtures thereof are copolymerizable with the alkylidene bisacrylamides; those having a formula containing at least one $>C=C<$ group, hereinafter referred to as the ethenoid group, and having appreciable solubility in water are suitable for use in the present invention. See U.S. Patent No. 2,801,985, hereby incorporated by reference. As set forth in this patent the unsubstittued bonds in the ethenoid group may be attached to one or more of many different atoms or radicals including hydrogen, halogens, such as chlorine and bromine, cyano, aryl, aralkyl, alkyl, and alkylene with or without solubilizing groups attached to these hydrocarbons. In addition, the substituents on the ethenoid group may comprise one or more hydrophilic groups including formyl, methylol, polyoxyalkylene residues and quaternary ammonium salt radicals, $$-O-\overset{O}{\underset{\|}{P}}(OH)_2$$

—OOCH, —OOCCH₃; —SO₃X, where X is H, NH₄, an alkali metal or an alkylamine; —CONR₂ and

—CH₂CONR₂ where each R is hydrogen, alkylol, lower alkyl or a polyoxyalkylene radical; and —COOR' and —CH$_2$COOR', where R' is a H, NH$_4$, alkali metal, alkaline earth metal, organic nitrogenous base, alkylol, lower alkyl or polyoxyalkylene radical. The large number of combinations and proportions of the various suitable substituents makes it impractical to list all compounds in this category which may be employed. The water solubility of these substances is known to depend chiefly on the number and type of hydrophilic and hydrophobic radicals therein; for example, the solubility of compounds containing an alkyl radical diminishes as the length of the alkyl chain increases and aryl groups tend to decrease water solubility whereas the aforesaid hydrophilic substituents all tend to improve the solubility of a given compound in water. Accordingly, the comonomer should be selected according to chemical practice from those containing sufficient hydrophilic radicals to balance any hydrophobic groups present in order to obtain the requisite water solubility of monomer.

Among the water-soluble ethenoid monomers, those containing an acrylyl or methacrylyl group are especially recommended. These are exemplified by N-methylol acrylamide, calcium acrylate and methacrylamide while acrylamide is optimum. Other suitable ethenoid compounds are acrylic acid; other N-substituted acrylamides, such as N-methyl acrylamide, N-3-hydroxypropyl acrylamide, dimethylaminopropyl acrylamide, N-ethylol acrylamide; acrylonitrile; saturated alkyl esters of acrylic acid, i.e. methyl acrylate, β-hydroxyethyl acrylate; ethylene glycol and polyethylene glycol acrylates, an example being the reaction product of β-hydroxyethyl acrylate or acrylic acid with about 1 to about 50 mols or more of ethylene oxide; salts of acrylic acid, i.e., magnesium arylate, sodium acrylate, ammonium acrylate, zinc acrylate, β-aminoethyl acrylate, β-methyl aminoethyl acrylate, guanidine acrylate and other organic nitrogenous base salts, such as diethylamine acrylate and ethanolamine acrylate; quaternary salts like alkyl acrylamidopropyl dimethylamino chloride; acrolein, β-carboxyacrolein, butenoic acid; α-chloroacrylic acid; β-chloroacrylic acid; as well as methacrylic acid and its corresponding derivatives.

Maleic acid and its corresponding derivatives including partial esters, partial salts, and ester salts thereof; maleamic, chloromaleic, fumaric, itaconic, citraconic, vinyl sulfonic, and vinyl phosphonic acids and their corresponding derivatives and mixtures thereof. Derivatives of this kind and other suitable compounds include α,β-dichloroacrylonitrile, methacrolein, potassium methacrylate, magnesium methacrylate, hydroxyethyl methacrylate, zinc β-chloroacrylate, trimethylamine methacrylate, calcium α-chloromethacrylate, diethyl methylene succinate, methylene succindiamide, monomethyl maleate, maleic diamide, methylene malonamide, diethyl methylene malonate, methyl isopropenyl ketone, ethyl vinyl ketone, propyl vinyl ketone, vinyl formate, vinyl lactate, vinyl acetate, vinyl bromoacetate, vinyl chloroacetate, vinyl pyrrolidone, allyl levulinate, allyl alcohol, methallyl alcohol, diallyl carbonate, allyl lactate, allyl gluconate, di(β-aminoethyl) maleate, di(methylaminoethyl) maleate, di(N,N-dimethyl β-aminoethyl) maleate, sulfonated styrene, vinyl pyridine, maleic anhydride, sodium maleate, ammonium maleate, calcium maleate, monopotassium maleate, monoammonium maleate, monomagnesium maleate, methyl vinyl ether, N-aminoethyl maleamide, N-aminoethyl maleimide, alkyl aminoalkyl maleamides, N-vinyl amines, N-allyl amines, heterocyclic ethenoid compounds containing nitrogen in a tertiary amino group, and the amine and ammonium are salts of said cyclic compounds, N-vinyl acetamide, N - vinyl-N-methyl formamide, N-vinyl-N-methylacetamide, N-vinyl succinimide, N-vinyl diformamide, N-vinyl diacetamide, vinyl sulfonyl chloride, vinyl sulfonic acid salts, vinyl sulfonic acid amides, vinyl oxazolidone, allyl amine, diallyl amine, vinyl methyl pyridinium chloride, and allyl trimethyl ammonium chloride to name only a few of the operative compounds.

The preferred resin-forming material which can be utilized in the method of the present invention is in an aqueous medium and has an initial viscosity approximating that of water. This material can be formed by dissolving a mixture of acrylamide and N,N'-methylene bisacrylamide in fresh water. Generally, this mixture contains about 1 to 25 weight percent, preferably about 1 to 10 of N,N'-methylene bisacrylamide and about 99 to 75 weight percent of acrylamide, preferably about 99 to 90. The aqueous solution will usually include from about 5 weight percent of this mixture to its limit of solubility and preferably this amount is about 5 to 25 percent. Although the acrylamide as such is preferred, its nitrogen atom could be substituted as with a hydroxy methyl or a hydroxy ethyl group. A specific resin-forming material found useful is an aqueous solution which contains 20 weight percent of resin-forming material (95 weight percent of acrylamide, 5 weight percent of N,N'-methylene bisacrylamide) and the balance being water. The mixture is not particularly catalyzed by contact with iron, brass or copper and has an initial viscosity (1.3 centipoises) approximating that of water (which is about 0.5 to 1.5 centipoises under the conditions in many well bores) and is not greater than about 2.0 centipoises over its working life to facilitate its placement in the desired well area. The specific gravity of the mixture is about 1.12.

The polymerization reaction proceeds by a free radical mechanism. It occurs in two steps as follows:

(1) Catalyst→free radicals
(2) Free radicals+monomer→polymer

The time required for the first reaction to produce enough free radicals to initiate the second reaction is known as the induction period or gel time. During this period the viscosity of the solution remains almost constant. At the end of the period, heat is evolved and long, flexible polymer chains are formed very rapidly. The chains become cross-linked during the polymerization to produce a complex, stiff matrix which binds the water into a gel.

The redox catalyst system employed in the resin-forming mixture generally includes an oxidizing agent, i.e. the catalyst, and reducing agent, i.e. promoter. The oxidizing component of the redox catalyst system can include, for instance, any of the usual water-soluble peroxy catalysts derived from per-acids such as persulfuric, perchloric, perboric, and permanganic and their salts. For example, ammonium, potassium and sodium persulfates, hydrogen peroxide, the alkali metal and ammonium perchlorates and the like may be employed. Among the reducing components that can be employed are the oxygen-containing sulfur compounds such as the alkali metal, e.g. sodium or potassium, bisulfites, ascorbic acid and nitrilo trispropionamide. Examples of typical oxidizing agent-reducing agent combinations are sodium persulfate, potassium persulfate, or ammonium persulfate-nitrilo trispropionamide. The redox components are employed in catalytic amounts. The amounts of each of the oxidizing agent and reducing agent usually are about 0.01 to 5 or 10 weight percent but preferably about 0.1 to 0.6 or 2 weight percent based on the aqueous solution of the resin-forming material. A mixture of the catalyst and promoter components in a redox system in quantities corresponding to their oxidizing-reduction equivalent is not required but may be desirable for some purposes.

The fluoride ion component is incorporated into the catalyzed resin-forming material in polymerization inhibiting amounts and it can be provided by employing a fluoride ion containing compound or other compound which will produce the fluoride ion. Fluoride ion yielding compounds include, for instance, inorganic water soluble compounds that ionize to give fluoride ions such as HF, NH$_4$HF$_2$, and metallic compounds such as alkali metal fluorides, e.g. NaF. The amount of fluoride ion or fluoride ion yielding compound employed depends upon the type and concentration of the catalyst in the resin-forming materials and is generally from about 0.05 to 10 weight percent and preferably from about 0.1 to 5 weight percent based on the aqueous solution of resin-forming material. Advantageously, a solid fluoride ion component is employed. It can be incorporated into the catalyzed resin-forming liquid mixture in any desired manner. For instance, when the resin-forming mixture is to be used in a well bore it can be incorporated prior to, or after, placement of the mixture in the well bore but before the resin-forming material is past the liquid state. If polymerization has begun, it may be stopped if desired by fluoride ion addition. When the resin-forming material includes the fluoride ion, it is not particularly catalyzed by contact with steel.

The silica component is employed in the method of the present invention in polymerization initiating amounts to effect copolymerization of the polymerizable monomers in the resin-forming mixture containing the catalytic or redox system and fluoride ion. This component is empolyed when it is desired to initiate polymerization and in amounts generally from about 0.01 to 10% and preferably 0.1 to 5% based on the aqueous solution of resin-forming material. The silica can be added to the resin-forming material as such or suitable silica-containing components or silica yielding compounds can be employed. These compounds include, for instance, the nonmetallic silicate minerals as well as quartz ($SiO_2$), sandstone and others, alone or in combinations. The silicates include clay, granite, feldspar, mica and many other common inorganic minerals containing silica which can be solubilized at least to a small extent in the solution of resin forming materials. To more efficiently solubilize the silica from the silica containing components into the solution of resin forming material, a silica solubilizing component can be employed. These solubilizers include, for instance, solutions of NaOH, $Na_2$+HCl, silicic acid, silicic acid+$CaCO_3$ and mixtures of these components. Silica containing materials are usually present in wells and, accordingly, in one embodiment of the present invention, fluoride ion-containing, catalyzed, resin-forming liquid can be conducted to the desired location in the well bore and upon contact with these silica materials, polymerization of the resin-forming liquid can be effected.

In addition to the above mentioned ingredients, the resin-forming mixture employed in the process of the present invention may include other components, particularly when they are destined for use in processes for plugging permeable well areas. For instance, other compounds exhibiting catalytic activity i.e. oxidizing agents, or weighting agents may be added. Components exhibiting catalytic activity can be added prior to injection of the compositions in the well bore. Care must be exercised as to the amount of catalytic material added and this will depend upon the specific component employed. In general, the viscosity of the material at the temperatures and pressure encountered in the bore hole is such that it has a viscosity of up to about 10 to 15 centipoises, advantageously about 1 to 5 centipoises, at these conditions. The fluoride ion is advantageously included in the composition when it is of this consistency. As pointed out above, ammonium persulfate is an acceptable oxidizing agent to polymerize the aqueous mixture and it can be employed with various reducing agents or promoters such as sodium thiosulfate or nitrilotrispropionamide in accordance with the method of the present invention.

As to using these resin-forming compositions in various embodiments of some well plugging processes of the present invention, unless the material is light enough to remain upon the surface of the salt water which has a specific gravity greater than 1, generally at least about 1.2, it must be quickly displaced into the permeable area before it can disperse into the salt water phase or an overlying fresh water layer, if any be present. To reduce the chances of this happening, resin-forming materials having specific gravities of up to about 1.18, preferably up to about 1.13, can be used. Also, as it may be advantageous to locate the resin-forming material between the salt water layer and an overlying fresh water column, the resin-forming material can preferably have a specific gravity of at least about 1.07, more desirably at least about 1.11. The specific gravity of the resin-forming material can be adjusted by the addition of weighting agents. Suitable weighting agents include water-soluble, non-ionizing organic compounds, e.g. sugar and glycerol. Calcium chloride, for instance, in amounts from about 15 to 30 weight percent can be used when it is desired to place the resin-forming material on the bottom of a well bore.

This resin-forming material is of the type that will polymerize at temperatures encountered in the well bore, which in many cases are between about 50 to 200° F. The quantity of resin-forming material used in the well bore in accordance with the embodiments of the present invention must be adequate to extend horizontally into the formation of ingress for a distance sufficient to securely seal this formation subsequent to the hardening of the resinous material. This distance usually extends at least about six inches into the formation. Moreover, in this method it is preferred that the resin-forming composition occupy the well bore adjacent the formation of ingress when the hardened resin is formed.

The following specific examples will serve to illustrate the invention but are not to be considered limiting.

EXAMPLE I

*Composition preparation*

To a 500 cc. portion of an aqueous solution including 10 weight percent of AM-955 resin-forming material (95% acrylamide and 5% N,N'-methylene bisacrylamide) under ambient conditions are added 0.90 gram of nitrilotrispropionamide (N.T.P.), 0.45 gram of ammonium persulfate (A.P.) and 0.25% of $NH_4HF_2$, a fluoride ion yielding compound. This composition has an initial viscosity of 1.08. The composition was subjected to electrolysis and was allowed to stand overnight but did not set. A similar composition which did not contain fluoride ion set in 30 minutes thus showing the polymerization inhibition characteristics of a composition containing the fluoride compound.

EXAMPLE II

*Polymerization method*

Twenty-five grams of sand, a silica containing component, were added the next morning to the resin-forming composition of Example I which contained the fluoride ions. The composition set to a gel in 1.5 hours. This shows the polymerization initiating characteristics of a silicon-containing component employed in accordance with the method of the present invention to copolymerize the copolymerizable monomers in the novel composition described in Example I containing the fluoride ion.

EXAMPLE III

The data presented in the following tables show the inhibiting properties of ammonium bifluoride (a fluoride ion provider) inhibitor with the polymerizing agents, N.T.P. (nitrilotrispropionamide) and A.P. (ammonium persulfate), in 200 ml. of 10 percent solutions of AM-955 (acrylamide and N,N'-methylene bisacrylamide).

*Table A*

|  | Grams/Liter | Grams/Gal. |
| --- | --- | --- |
| Amount of N.T.P. in AM-955 | 1.80 | 6.813 |
| Amount of A.P. in AM-955 | 0.90 | 3.407 |

| Sample No. | Percent HN₄FHF | Sample No. | Percent NH₄FHF |
|---|---|---|---|
| 1 | Control—None | 6 | 0.5—No gel. |
| 2 | 0.1—No gel | 7 | 0.6—No gel. |
| 3 | 0.2—No gel | 8 | 0.8—No gel. |
| 4 | 0.3—No gel | 9 | 1.0—No gel. |
| 5 | 0.4—No gel | | |

The control sample gelled in 22 minutes. None of the others gelled overnight but polymerized at once upon contact with silica.

*Table B*

| | Grams/Liter | Grams/Gal. |
|---|---|---|
| Amount of N.T.P. in AM-955 | 2.70 | 10.220 |
| Amount of A.P. in AM-955 | 1.35 | 5.110 |

| Sample No. | Percent NH₄FHF | Sample No. | Percent NH₄FHF |
|---|---|---|---|
| 1 | 0.1—Gelled in 160 min. | 5 | 0.8—Did not gel. |
| 2 | 0.2—Did not gel | 6 | 1.0—Did not gel. |
| 3 | 0.4—Did not gel | 7 | Control—Gelled in 15 min. |
| 4 | 0.6—Did not gel | | |

*Table C*

| | Grams/Liter | Grams/Gal. |
|---|---|---|
| Amount of N.T.P. in AM-955 | 3.60 | 13.626 |
| Amount of A.P. in AM-955 | 1.80 | 6.813 |

| Sample No. | Percent NH₄FHF | Sample No. | Percent NH⁴FHF |
|---|---|---|---|
| 1 | 0.3—Gelled in 120 min. | 4 | 0.8—Did not gel. |
| 2 | 0.4—Did not gel. | 5 | 1.0—Did not gel. |
| 3 | 0.6—Did not gel. | 6 | Control—Gelled in 5 min. |

*Table D*

NHIBITING CAPACITY OF AMMONIUM BIFLUORIDE IN AM-955—10% SOLUTION

| | Grams/Liter | Grams/Gal. |
|---|---|---|
| NH₄FHF necessary for inhibition: | | |
| 0.1%— | | |
| N.T.P. | 1.80 | 6.813 |
| A.P. | 0.90 | 3.407 |
| 0.2%— | | |
| N.T.P. | 2.70 | 10.220 |
| A.P. | 1.35 | 5.110 |
| 0.4%— | | |
| N.T.P. | 3.60 | 13.626 |
| A.P. | 1.80 | 6.813 |

The above tabulations show the polymerization inhibiting characteristics of fluoride ions employed in various concentrations to provide the novel catalyzed compositions of the present invention. The above data also show that as the concentration of the catalyst system in the resin-forming materials is increased, a greater concentration of the fluoride ions is required in the materials to inhibit polymerization and, accordingly, a greater concentration of silica is necessary to effect polymerization.

The data presented in Table E show the polymerization effecting properties of sand, sodium silicate and sodium hydroxide on contact with 200 ml. of a 10 percent solution of AM-955 (acrylamide and N,N'-methylene bisacrylamide) polymerized with A.P. (ammonium persulphate) and N.T.P. (nitrilotrispropionamide), and inhibited with varying amounts of ammonium bifluoride. A standard amount of sand, 150 grams, in 250 ml. beakers was used in these tests providing the data. Unless otherwise stated, NaOH means ml. of solution—10 grams NaOH diluted to 100 with water, and Na₂SiO₃ means a 10% water solution of sodium silicate.

*Table E*

| Sample No. | Grams of N.T.P./Liter of AM-955 | Gram of A.P./Liter of AM-955 | Weight percent of NH₄FHF | Polymerization Initiating Conditions | Results |
|---|---|---|---|---|---|
| 1 | 2.70 | 1.35 | 0.2 | Placed in sand in beaker | Gelled in 2 hours. |
| 2 | 3.60 | 1.80 | 1.2 | NaOH+Na₂SiO₃ (20% soln.) 200 ml. not in sand | Gelled in 5 minutes. |
| 3 | 3.60 | 1.80 | 1.2 | NaOH in sand | Gelled in 15 minutes. |
| 4 | 3.60 | 1.80 | 1.2 | NaOH with Na₂SiO₃ in sand | Gelled in 10 minutes. |
| 5 | 2.70 | 1.35 | 0.5 | Sand saturated w./10% soln. of Na₂SiO₃ | Gelled in 30 minutes. |
| 6 | 2.70 | 1.35 | 0.75 | Sand with 30 ml. of 10% Na₂SiO₃ soln. pH 9.5 | Gelled in 17 minutes. |
| 7 | 3.60 | 1.80 | 1.0 | 1 wt. percent Na₂SiO₃ | Gelled in 12 minutes. |
| 8 | 3.60 | 1.80 | 1.0 | 2 wt. percent Na₂SiO₃ | Gelled in 5 minutes. |

These tests show that AM-955, with N.T.P., A.P. ammonium bifluoride as an inhibitor, can be polymerized by silica containing components along wth silca solubilizing sodium hydroxide solutions.

EXAMPLE IV

The present invention can be incorporated in a method employed in plugging a permeable well location, for instance, in a method described in copending application Serial No. 642,867, filed February 27, 1957, hereby incorporated by reference. In this method the area to be plugged must first be located as to its vertical position in the well bore. This area is spaced away from the bottom of the bore and generally will be between two adjacent areas of lesser permeability although this is not an absolute necessity. Salt (NaCl) water or brine is then provided in the well bore in an amount sufficient to reach the approximate location of the area to be plugged. The level of the salt water can be at or slightly below or above the plugging area but it should not be vertically displaced a distance from the area such that substantial plugging occurs in locations where it is not desired. The salt water can be added as such to the well or fresh water can be injected which after remaining a sufficient period in the bore will become salty due to the presence of salt in the earth's strata. After the proper level of salt water is established an organic resin-forming material is positioned on this medium. Preferably, the salt water layer is below a fresh layer with these materials forming an interface in the approximate location of the permeable area, and in this case the resin-forming material is positioned on the salt water layer and thus in the interface between these layers. The resin-forming material is then displaced into the adjacent well area or stratum as by natural flow or by a separately applied gaseous or liquid pressure and allowed to remain in the area to set up or harden to provide a partial or complete plug resistant to the flow of fluids, particularly liquids. The permeable area to be plugged can be located by conventional procedures e.g. the use of liquid-to-liquid interfaces between two dissimilar liquids such as water and oil, fresh and salt water, and radioactive and non-radioactive liquids e.g., see U.S. Patents No. 2,376,878 and 2,413,436 and Pfister, R. J., Trans. A.I.M.E., vol. 174, page 269, 1948, to determine the injectivity profile or liquid injection characteristics of the well or sand face.

By following the present invention, after the novel resin-forming material is displaced into the adjacent well area, a silica containing component, i.e. sand, is lowered into the well bore into an aqueous solution of alkylidene bisacrylamide and an ethylenic monmer containing N.T.P., A.P. and ammonium bifluoride in concentrations described above in Example I, and polymerization is effected. The polymerized material is a solid and thus seals the permeable formation. Alternatively, when silica containing materials, e.g. sand, are present in the formation to be sealed, the resin-forming material can be polymerized to a solid by contact with these materials, thus obviating the necessity of introducing sand into the formation or resin-forming material.

EXAMPLE V

The present invention can also be incorporated in a method for combatting the effect of a reduction or a cessation of the air circulation in air-drilling methods when drilling through permeable areas from which gas, liquid or loosely consolidated strata enters the well bore being drilled.

The desired result is accomplished by selectively and substantially completely sealing formations of this character from the well bore in an expeditious and economical manner so as to maintain the advantages of the air-drilling procedures over the conventional procedures which use mud as the circulating medium. A method of this type is described in copending application Serial No. 686,198, filed September 25, 1957, hereby incorporated by reference.

As described in this application, when an obstruction of air circulation, i.e. a reduction or cessation thereof, is experienced during an air-drilling operation and the obstruction is attributed to the ingress of gas, liquid or loosely consolidated earth particles into the bore from an adjacent stratum, resin-forming material is introduced into the well bore. This material is of the type that will harden at temperatures encountered in the well bore, which in many cases are between about 50 to 200° F. The quantity of the novel resin-forming material used must be adequate to extend horizontally into the formation of ingress for a distance sufficient to securely seal this formation subsequent to the hardening of the resinous material to prevent further ingress of unwanted extraneous materials. This distance usually extends at least about six inches into the formation. Moreover, in this method it is preferred that the resin-forming material occupy the well bore adjacent the formation of ingress when the hardened resin is formed. Accordingly, after the introduction of the resin-forming material into the well bore detection means are employed to track the upper level of the resin-forming material, gas or liquid, e.g. air or water pressure, is applied to bring this upper level approximately adjacent the upper level of the strata of ingress, and the resinous material is maintained in this position until it solidifies. Although gas or liquid pressure can be employed in our method, gas is preferable to liquid since (a) it permits better control of the plastic material, (b) the position of the resin-forming material is determined with facility as a result of the sharp difference in electrode readings (milliamps) between plastic and air and (c) the well bore hole is dry following the polymerization of the resin-forming materials. The gas pressure will depend upon the nature of the obstruction encountered but is generally from about 150 to 1000 p.s.i. Following solidification of the resinous material, air-drilling is resumed.

In the practice of this method, it may be desirable to place a small volume of liquid or primary buffer before the resin-forming material to prevent contact of the resinous material with the materials in the lower portion of the well bore, e.g. salt water. This primary buffer should have a density in between that of the well bore fluid and the resinous material so that the buffer will have a tendency to float or remain between the well fluid and resinous material. Examples of suitable buffers are mixtures of 60% by volume of kerosene and 40% by volume of carbon tetrachloride with a specific gravity of 1.13 or mixtures of 82% by volume of kerosene and 18% by volume of tetrabromo ethylene.

It may also be desirable to place on the resin-forming material a volume of liquid or secondary buffer possessing a degree of electrical conductivity appreciably different from that of the resin-forming material to facilitate tracking of the resin-forming material; the density of the secondary buffer should be less than that of the resinous material and preferably greater than that of any fluid, liquid, or gas, used to pressure the resinous material to its position of hardening. Suitable secondary buffers are 2% by weight of calcium chloride in water with specific gravity of 1.015 and 4% ammonium chloride in water solution with specific gravity of 1.01. When the resin-forming material is appreciably electrically conductive, the secondary buffer can be essentially non-conductive.

The detection means employed for tracking the position of the resin-forming material in the well bore can vary. In one method, a soluble radioactive tracer may be injected into the polymerizable material and a Geiger counter attached to a line can be employed to locate the polymerizable material and thus by checking the depth of the Geiger counter, the position of the polymerizable material is known. In another method, the characteristics of the material can be such that it is detectable by an electrical conductivity profiling unit when the secondary buffer is placed on the resin-forming material. Thus if the secondary buffer is essentially conductive and the resin-forming material is essentially non-conductive the conductivity profiling unit will indicate the degrees of current flow within the resin-forming material and secondary buffer. Accordingly, when the conductivity circuit is essentially good, the instrument is in the secondary buffer and when the conductivity circuit is essentially poor, the instrument is in the resin-forming material. Thus by raising and lowering the instrument the interface in between the resin-forming material and the secondary buffer can be located and by checking the depth of the detection instrument the location of the upper layer of the resin-forming material is known. Conversely, the secondary buffer may be essentially non-conductive and the resin-forming material may be essentially conductive such that an essentially good conductivity circuit indicates the presence of the instrument in the resin-forming material while an essentially poor conductivity circuit indicates presence of the instrument in the secondary buffer.

A device suitable for use in measuring the electrical conductivity of the fluids in the well bore is described in U.S. Patent 2,776,563. This device, known as a magnetic coupler, includes a magnetic core, and two electrically conducting coils essentially composed in two basic combinations. One of the combinations, conveniently referred to as a magnetic coupler sub, is essentially comprised of one of the coils, the first coil, surrounding the magnetic core and fixedly mounted within a structure. The other combination, conveniently referred to as the stinger, comprises a cable containing an insulated electrical conductor communicating with the other coil which is contained within a structure adapted to removably surround the first coil. Under operational conditions the magnetic coupler sub may be installed in a position just above the drill bit in a rotary type drill string. Accordingly, when the position of a liquid of known electrical conductivity within the well bore is desired, the stinger is lowered into the drill pipe string and joined to the magnetic coupler sub, the drill pipe is maneuvered until the liquid or the interface between liquids is located, and by noting the depth of the stinger, the position of the liquid or the interface between two liquids is known. Additionally, if a two-conductor cable is employed in the stinger arrangement the stinger itself can be used as an integral detection unit.

The present invention can be incorporated in this gas drilling method after the novel resin-forming material is in place. At this point a silica containing material, such as sand, is lowered into the well bore hole to effect polymerization of the material. Alternatively, when silica containing materials are present at the site in the well where the resin forming material is to be located and polymerized, the resin-forming material can be polymerized to a solid by contact with these materials, thus obviating the necessity of introducing sand into the site or the resin-forming material.

A myriad of uses for the compositions and method of the present invention will be obvious to those versed in the art. For instance, the novel compositions could be injected into openings of silica containing materials, e.g. cracks in basement walls, for the purpose of instantaneously plugging these openings. In the well treating field they can be employed to prevent lost circulation, to plug wells using a casing to avoid contacting the composition with silica materials in a well bore until the composition is in the desired location, or in the plugging of all perforations in a well bore liner followed by reperforations in selected areas.

It is claimed:

1. The method for copolymerizing an aqueous solution of a mixture consisting essentially of (a) about 1 to 25 weight percent of a monomeric alkylidene bisacrylamide of the formula

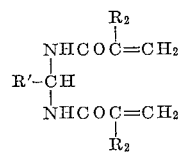

in which

is a hydrocarbon residue of an aldehyde containing from about 1 to 10 carbon atoms and $R_2$ is of the group consisting of hydrogen and methyl, and (b) about 75 to 99 weight percent of another ethylenic monomer copolymerizable with (a), (c) catalytic amounts of a redox catalyst system, and (d) polymerization inhibiting amounts of fluoride ion, comprising contacting the solution with polymerization initiating amounts of silica to obtain copolymerization of the monomers to provide a solid material.

2. The method for decreasing the permeability of a permeable well area in a well the steps comprising introducing an aqueous solution of a resin-forming material, consisting essentially of (a) about 1 to 25 weight percent of a monomeric alkylidene bisacrylamide of the formula

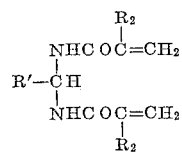

in which

is a hydrocarbon residue of an aldehyde containing from about 1 to 10 carbon atoms and $R_2$ is of the group consisting of hydrogen and methyl, and (b) about 75 to 99 weight percent of another ethylenic monomer copolymerizable with (a), (c) catalytic amounts of a redox catalyst system, and (d) polymerization inhibiting amounts of fluoride ion, into the permeable well area and contacting the solution with polymerization initiating amounts of a silica to set the mixture therein and decrease the permeability of the area.

3. An aqueous composition consisting essentially of a mixture of (a) about 1 to 25 weight percent of a monomeric alkylidene bisacrylamide of the formula

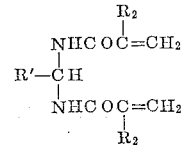

in which

is a hydrocarbon residue of an aldehyde containing from about 1 to 10 carbon atoms and $R_2$ is of the group consisting of hydrogen and methyl, and (b) about 75 to 99 weight percent of another ethylenic monomer copolymerizable with (a), (c) catalytic amounts of redox catalyst system, and (d) polymerization inhibiting amounts of fluoride ion.

4. The method of claim 1 wherein the bisacrylamide is N,N'-methylene bisacrylamide.

5. The method of claim 4 wherein the ethylenic monomer is acrylamide.

6. The method of claim 1 wherein the polymerization inhibiting amounts of fluoride ion are from about 0.05 to 10 weight percent.

7. The method of claim 6 wherein the fluoride ion is provided by an inorganic fluoride ion yielding compound.

8. The method of claim 7 wherein the redox catalyst system is comprised of ammonium persulfate and nitrilotrispropionamide and the fluoride ion yielding compound is $NH_4HF_2$.

9. The method of claim 8 wherein the bisacrylamide is N,N'-methylene bisacrylamide and the ethylenic monomer is acrylamide.

10. The method of claim 2 wherein the bisacrylamide is N,N'-methylene bisacrylamide.

11. The method of claim 10 wherein the ethylenic monomer is acrylamide.

12. The method of claim 2 wherein the polymerization inhibiting amounts of fluoride ion are from about 0.05 to 10 weight percent.

13. The method of claim 12 wherein the fluoride ion is provided by an inorganic fluoride ion yielding compound.

14. The method of claim 13 wherein the redox catalyst system is comprised of ammonium persulfate and nitrilotrispropionamide and the fluoride ion yielding compound is $NH_4HF_2$.

15. The method of claim 14 wherein the bisacrylamide is N,N'-methylene bisacrylamide and the ethylenic monomer is acrylamide.

16. The composition of claim 3 wherein the bisacrylamide is N,N'-methylene bisacrylamide.

17. The composition of claim 16 wherein the ethylenic monomer is acrylamide.

18. The composition of claim 3 wherein the polymerization inhibiting amounts of fluoride ion are from about 0.05 to 10 weight percent.

19. The composition of claim 18 wherein the fluoride ion is provided by an inorganic fluoride ion yielding compound.

20. The composition of claim 19 wherein the redox catalyst system is comprised of ammonium persulfate and nitrilotrispropionamide and the fluoride ion yielding compound is $NH_4HF_2$.

21. The composition of claim 20 wherein the bisacrylamide is N,N'-methylene bisacrylamide and the ethylenic monomer is acrylamide.

22. A method for combatting the obstruction of gas circulation in drilling wells employing gas as a circulation medium, when the obstruction results from the ingress of extraneous materials into the well bore, comprising introducing into the well bore an aqueous solution of a mixture consisting essentially of (a) about 1 to 25 weight percent of N,N'-methylene bisacrylamide, (b) about 75 to 99 weight percent of acrylamide, (c) catalytic amounts of ammonium persulfate and nitrilotrispropionamide, and (d) about 0.05 to 10 weight percent of an inorganic fluoride ion yielding compound, tracking the position of the resin-forming material in the well bore with detection means, applying pressure to the upper level of the resinous composition until said level is at the approximate depth of the top level of the formation of ingress, contacting the solution with polymerization initiating amounts of a silica to set the mixture therein and decrease the permeability of the area, drilling through the solidified resin and continuing drilling with gas circulation to remove cuttings from the well.

23. A method for selectively decreasing the permeability of a well area, the steps comprising locating adjacent the well bore a permeable area to be plugged which is spaced upwardly from the bottom of the well bore, providing a salt water layer in the lower portion of the well bore to the approximate location of the permeable area, positioning on said salt water layer an aqueous solution of a mixture consisting essentially of (a) about 1 to 25 weight percent of N,N'-methylene bisacrylamide, (b) about 75 to 99 weight percent of acrylamide, (c) catalytic amounts of ammonium persulfate and nitrilotrispropionamide, and (d) about 0.05 to 10 weight percent of an inorganic fluoride ion yielding compound, said composition having a viscosity of up to about 15 centipoises, moving the resin-forming composition in the adjacent permeable area while the viscosity is up to about 15 centipoises, and contacting the resin-forming composition with polymerization initiating amounts of a silica to set the mixture therein and decrease the permeability of the area.

References Cited by the Examiner

UNITED STATES PATENTS

| | | | |
|---|---|---|---|
| 2,796,934 | 6/1957 | Vogel | 166—33 |
| 2,801,984 | 8/1957 | Morgan | 252—8.5 |
| 2,801,985 | 8/1957 | Roth | 260—80.3 |
| 2,940,729 | 6/1960 | Rakowitz | 166—33 |

MORRIS LIEBMAN, *Primary Examiner.*

DANIEL ARNOLD, *Examiner.*